Oct. 16, 1951 E. L. BOYCE ET AL 2,571,669
LAWN MOWER REEL DRIVE

Filed Nov. 12, 1947 2 SHEETS—SHEET 1

Inventors
Eugene L. Boyce
Milford D. Burrows
by Parker & Carter
Attorneys

Oct. 16, 1951  E. L. BOYCE ET AL  2,571,669
LAWN MOWER REEL DRIVE
Filed Nov. 12, 1947  2 SHEETS—SHEET 2
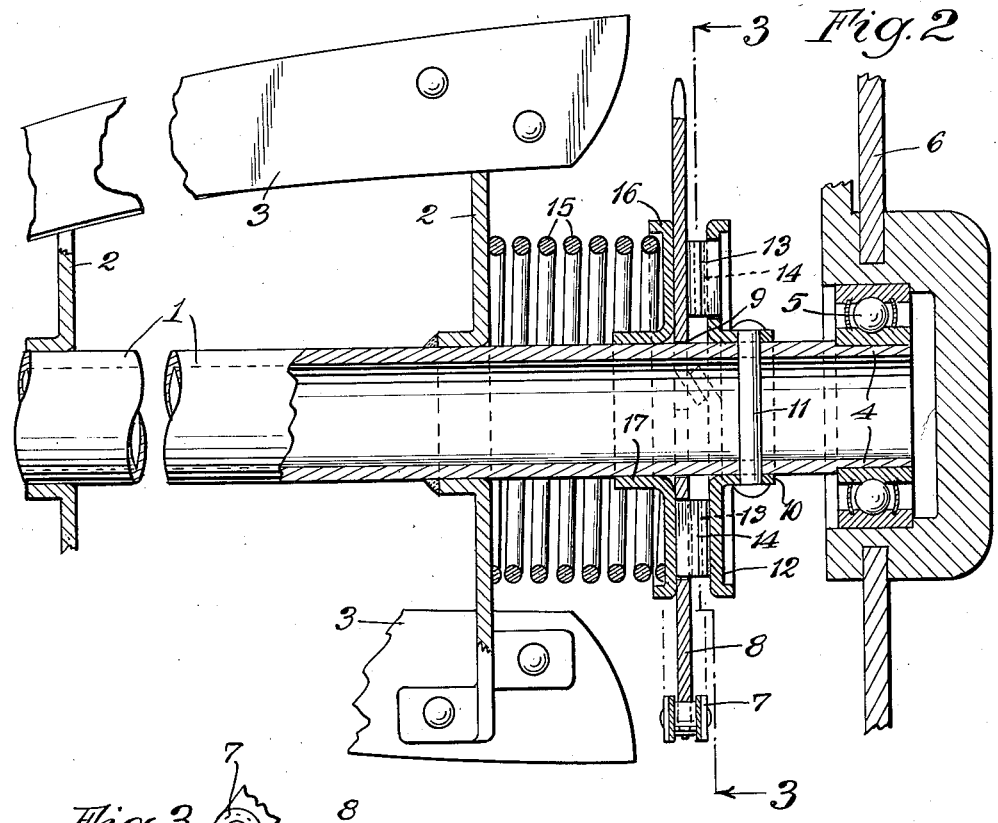
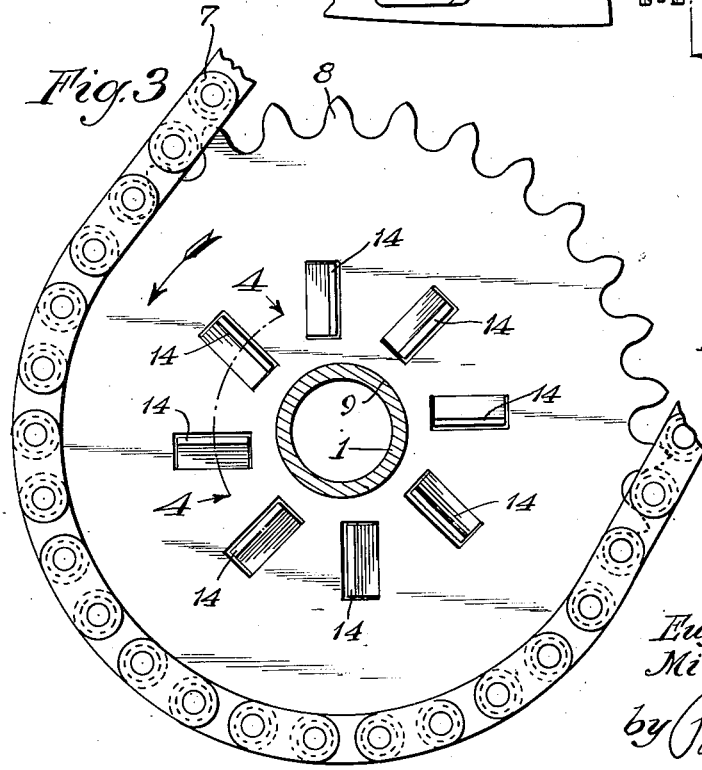
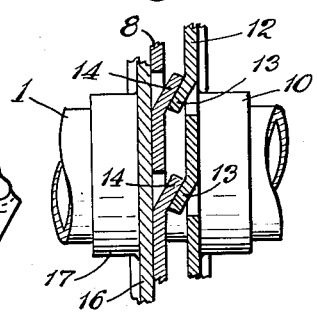
Inventors
Eugene L. Boyce
Milford D. Burrows
by Parker & Carter
Attorneys Patented Oct. 16, 1951

2,571,669

UNITED STATES PATENT OFFICE 2,571,669

LAWN MOWER REEL DRIVE

Eugene L. Boyce and Milford D. Burrows, Chicago, Ill., assignors to Pioneer Gen-E-Motor Corporation, Chicago, Ill., a corporation of Delaware Application November 12, 1947, Serial No. 785,386

2 Claims. (Cl. 56—249)

This invention relates to an improvement in driving the reel or cutter of a lawnmower.

One purpose is to provide an improved drive in which provision is made to interrupt the drive, or to permit slippage, when the reel strikes a solid object.

Another purpose is to provide a releasable drive adapted to interrupt the transmission of power to the reel blades at the bar intersection when foreign matter is interposed between a reel blade and the cutter bar of a lawnmower.

Another purpose is to provide a drive which, during normal cutting, operates as a connected and adequate drive, but which permits an override when an excess resistance is interposed, such as is caused by the penetration of hard foreign material into the path of the cutter blade.

Another purpose is to provide a drive which is releasable, in response to excess resistance, in one direction of rotation, and which is not releasable in an opposite direction of rotation.

Another purpose is to provide means of and a method for freeing objects lodged between the reel and the mower cutter bar by subjecting such objects to vibration, the vibration being caused by the lodgment of the object.

Other purposes will appear from time to time in the course of the specification and claims.

We illustrate the invention more or less diagrammatically in the accompanying drawings, wherein:

Figure 2 is an enlarged vertical partial section illustrating the reel and clutch mechanism;

Figure 3 is a section on the line 3—3 of Figure 2;

Figure 4 is a section along the line 4—4 of Figure 3;

Like parts are indicated by like symbols throughout the specification and drawings.

Figure 1:
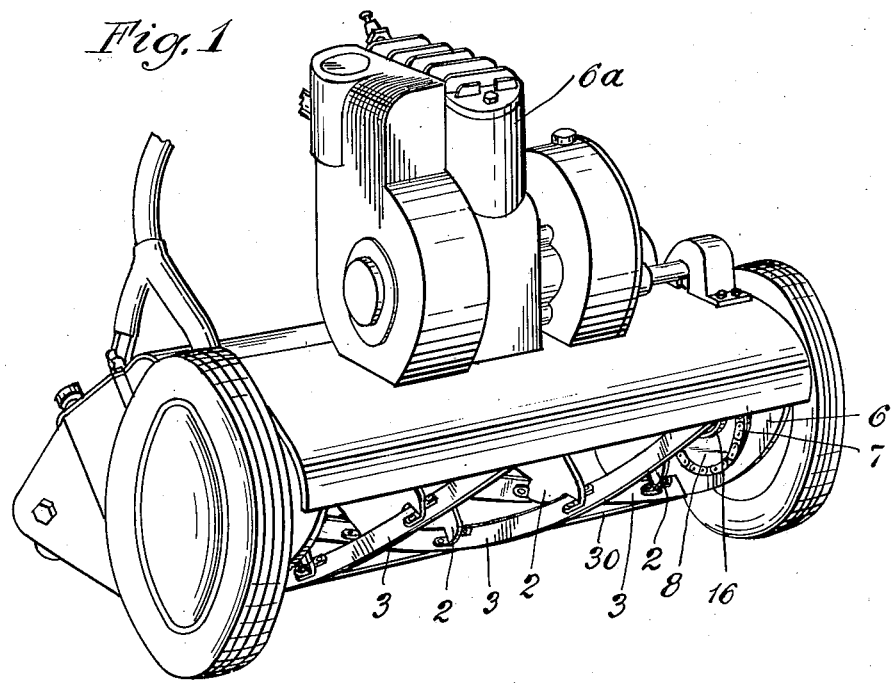
Figure 1 is a perspective view of the invention.
Figure 5:
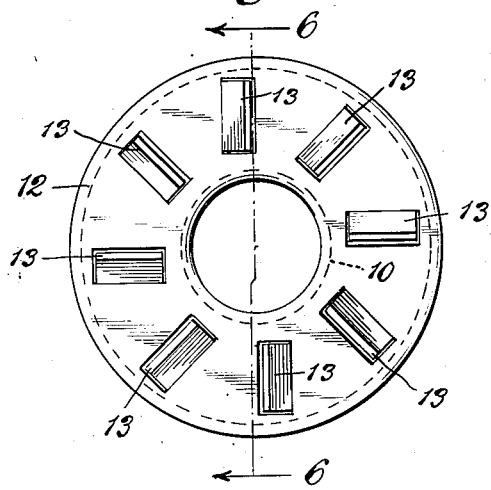
Figure 5 is a plan view of one of the clutch members.
Figure 6:
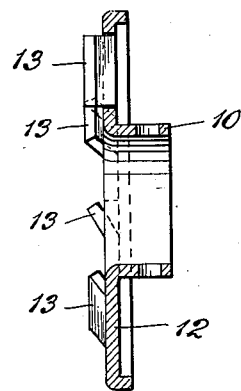
Figure 6 is a section along the line 6—6 of Figure 5.

Referring to the drawings, I generally indicates the shaft of a lawnmower reel, herein illustrated as a hollow shaft. It carries a plurality of spiders 2, to the end of which are secured a plurality of reel blades 3. The shaft has terminal end bearing portions 4 which may be received in any suitable bearing assemblies 5, suitably mounted in end plates 6 of a lawnmower. Any suitable power source, such as the motor 6ª, may be used to drive the reel. We illustrate, for example, a chain 7 passing around the reel sprocket 8. The reel sprocket 8 is apertured, as at 9, to receive the reel shaft 1.

Permanently secured to the reel shaft, as by the hub 10 and the pin 11, is the clutch disk or clutch component 12. It is provided with a plurality of projections or teeth 13 having inclined surfaces. Similar teeth 14, with corresponding and opposed inclined surfaces, are shown as formed in the sprocket 8. It will be understood that when the sprocket 8 and the member 12 are thrust against each other with sufficient force to prevent slippage, the teeth 14 of the sprocket 8 exert an effective driving thrust against the opposed inclined surfaces of the teeth 13 of the disk or cup 12. Thus, when the sprocket 8 is rotated, it rotates the disk 12, and, through it, the reel shaft 1. In order to maintain an effective thrust against the sprocket 8, to hold the teeth 13 and 14 in effective driving relationship, we employ yielding means such as the coil spring 15.

As shown in Figure 1, the coil spring 15 abuts at one end against one of the spiders 2. At the other end it abuts against the cup or disk 16 which is movable along the shaft 1. It engages the shaft 1 by means of the centering or guiding flange or sleeve 17. As shown in Figure 1, the spring 15 is expanded sufficiently to urge the ring 16 and the sprocket 8 into position in which the sprocket 8 is in clutching relationship with the disk 12.

Assume that one of the reel blades 3 strikes against solid material on the lawn, or pinches a stick or stone or piece of metal against the cutter bar 30. In that event, the resistance to the rotation of the reel shaft 1 immediately increases. A relatively slight increase in resistance is enough to prevent any further rotation of the reel shaft 1. When such stoppage takes place, the teeth 14 of the reel sprocket 8 simply override the opposed teeth 13 of the disk 12, and now power is applied to the reel blade at its intersection with the bar, where the interrupting material is located. Thus there is a minimum of wear or distortion or nicking of bar or reel. The sound of the overriding of the teeth is an instant and effective warning to the user that an interruption has taken place. The user can then promptly cut off the power and remove the cause of the interference.

An important advantage or characteristic of the above described structure is the freeing, by vibration, of objects lodged between the reel and the mower cutter bar. The vibration is caused by the lodged object, and continues until the lodged object is freed, or until the motor is cut off. Referring, for example, to Figure 4, it will be understood that when no object is lodged, and when the cutter is operating normally, the inclined teeth or ears, 13 and 14, move in unison, with no vibration or chatter. But assume that a foreign object which cannot readily be cut becomes lodged between the reel and the mower cutter bar, the set of teeth or ears which normally move with the reel are held against rotation, because the reel itself is stalled or held by the foreign object. However, the engine drive continues the normal rotation of the opposite clutch member with its inclined teeth or ears and the result is a violent noise or clatter, and also a violent vibration of the sprocket and the held object. As a matter of experience this vibration is generally sufficient to cause the removal or elimination of the foreign object which has stalled the cutter and caused the vibration. It very shortly drops out, and the continued normal operation of the device is then resumed, without the necessity of interference on the part of the user. On the other hand, if the vibration is not sufficient to cause the removal of the lodged object, then the continuing noise and clatter is enough to warn the operator to remove the object himself. This he can do by throwing the motor out of clutch and freeing the lodged object.

It will be realized that, whereas, we have described and illustrated a practical and operative device, nevertheless many changes may be made in the size, shape, number and disposition of the parts without departing from the spirit of our invention. We therefore wish our description and drawings to be taken as in a broad sense illustrative or diagrammatic, rather than as limiting us to our precise showing.

The use and operation of the invention are as follows:

We illustrate an improved drive and clutch mechanism for lawnmowers, operable with a reel of a power driven lawnmower. Any interruption, such as the contact against a reel blade of a piece of uncuttable material, promptly stops rotation of the reel. The yielding drive or clutch arrangement above described is sufficiently positive to cut grass, but is insufficient to force a reel blade against an interfering object with sufficient force to damage either the reel blade or the cutter blade. The noise which the clutch makes when the members 8 and 12 are not rotating in unison, serves as an instant warning to the operator. When the parts are rotated in a reverse direction, the abutting ends of the teeth 13 and 14 constitute a positive drive. As above mentioned, the vibration caused by the chatter or contact of the members 13 and 14 is normally effective in vibrationally freeing the twig or other material which lodges between the cutter bar and the reel.

Whereas we have described our invention as applied to a power driven lawnmower, it will be understood that it may be applied also to hand driven lawnmowers as well.

We claim:

1. In a lawnmower reel assembly and driving means therefor, a reel shaft having blade supporting spiders thereon, a driven member secured to the shaft and a drive member on the shaft, apertured to permit the passage of the shaft therethrough, the driving member and the driven member having parallel body webs lying in planes generally perpendicular to the axis of the reel shaft, the said two members having opposed generally radially extending matching projections spaced circumferentially about the axis of the reel shaft, and means for normally urging the drive member into driving relationship with the driven member, including a spring coiled about the reel shaft and compressed between one of the spiders and the drive member, the spring being of sufficient strength to maintain the drive under normal cutting conditions in driving relationship with the driven member, the angle and spacing of the opposed projections being adapted to impart substantial endwise vibration to the reel shaft when rotation of the reel shaft is inhibited.

2. In a lawn mower reel assembly and driving means therefor, a reel shaft having blade supporting spiders thereon, a driven member secured to the shaft and a drive member on the shaft, apertured to permit the passage of the shaft therethrough, the driving member and the driven member having parallel body webs lying in planes generally perpendicular to the axis of the reel shaft, the said two members being of sheet metal and each having struck out of its surface, toward the other, matching and generally radially disposed tongues of like angle, with normally abutting faces, and means for normally urging the drive member into driving relationship with the driven member, including a spring coiled about the reel shaft and compressed between one of the spiders and the drive member, the spring being of sufficient strength to maintain the drive under normal cutting conditions in driving relationship with the driven member, the angle and spacing of the opposed tongues being adapted to impart substantial endwise vibration to the reel shaft when rotation of the reel shaft is inhibited.

EUGENE L. BOYCE.
MILFORD D. BURROWS.

REFERENCES CITED

The following references are of record in the file of this patent:

UNITED STATES PATENTS

| Number | Name | Date |
|---|---|---|
| 1,779,699 | Gratiot | Oct. 28, 1930 |
| 1,925,270 | Metcalf | Sept. 5, 1933 |
| 2,062,593 | McCloud | Dec. 1, 1936 |
| 2,076,344 | Leake | Apr. 6, 1937 |
| 2,088,293 | Funk | July 27, 1937 |
| 2,145,083 | Dynes | Jan. 24, 1939 |
| 2,291,407 | Paul | July 28, 1942 |